United States Patent
Connors et al.

(10) Patent No.: US 6,739,610 B2
(45) Date of Patent: May 25, 2004

(54) WHEELCHAIR BRAKE APPARATUS AND WHEELCHAIR INCLUDING SAME

(75) Inventors: James B. Connors, Fayetteville, NY (US); Edward Iles, Liverpool, NY (US); Frank Famulare, Manlius, NY (US)

(73) Assignee: Air Movement Technologies, Inc., North Syracure, NY (US)

(*) Notice: Subject to any disclaimer, the term of this patent is extended or adjusted under 35 U.S.C. 154(b) by 0 days.

(21) Appl. No.: 10/118,462

(22) Filed: Apr. 8, 2002

(65) Prior Publication Data

US 2003/0189310 A1 Oct. 9, 2003

(51) Int. Cl.$^7$ .............................. B60T 1/14; B62M 1/14
(52) U.S. Cl. ............................ 280/304.1; 188/5
(58) Field of Search ......................... 280/250.1, 304.1; 188/2 R, 5

(56) References Cited

U.S. PATENT DOCUMENTS

| | | |
|---|---|---|
| 1,844,818 A | 2/1932 | Gattie |
| 1,880,129 A | 9/1932 | Gattie |
| 2,053,852 A | 9/1936 | Tracy |
| 2,259,924 A | 10/1941 | Connolly |
| 2,339,361 A | 1/1944 | Sill et al. |
| 2,426,451 A | 8/1947 | Hammack |
| 2,654,416 A | 10/1953 | Maniscalco |
| 2,753,919 A | 7/1956 | Sill |
| 3,302,757 A | 2/1967 | Eagleson, Jr. et al. |
| 3,360,305 A | 12/1967 | Ryskamp |
| 3,529,700 A | 9/1970 | Marshall |
| 3,664,453 A | 5/1972 | Cottrell et al. |
| 3,664,454 A | 5/1972 | Cottrell |
| 3,866,723 A | 2/1975 | Smith |
| 3,887,210 A | 6/1975 | Funke |
| 3,892,294 A | 7/1975 | Nieminski |
| 4,320,818 A | 3/1982 | Knoche |
| 4,320,819 A | 3/1982 | Erker |
| 4,350,227 A | 9/1982 | Knoche |
| 4,384,732 A | 5/1983 | Wierwille |
| 4,570,756 A | 2/1986 | Minnebraker et al. |
| 4,623,043 A | 11/1986 | Babilas |
| 4,733,755 A | 3/1988 | Manning |
| 4,852,697 A | 8/1989 | Kulik |
| 5,203,433 A | 4/1993 | Dugas |
| 5,350,036 A | 9/1994 | Shima |
| 5,706,909 A | 1/1998 | Bevins et al. |
| 5,894,912 A | 4/1999 | Dobben |
| 5,984,334 A | 11/1999 | Dugas |
| 6,092,824 A | 7/2000 | Ritchie et al. |
| 6,264,007 B1 | 7/2001 | Norton et al. |
| 6,347,688 B1 | 2/2002 | Hall et al. |
| 2002/0175027 A1 * | 11/2002 | Usherovich .................. 188/2 F |

* cited by examiner

Primary Examiner—Kevin Hurley
(74) Attorney, Agent, or Firm—Burr & Brown (57) ABSTRACT

An automatically engageable and releasable brake apparatus for a wheelchair, including a connection mechanism adapted to be attached to a portion of the frame of the wheelchair proximate a rear wheel of the wheelchair, a seat actuation member extending from a portion of the connection mechanism and adapted to be positioned substantially beneath the seat of the wheelchair, a shaft member positioned to extend substantially downwardly from a portion of the connection mechanism and a friction member positioned proximate the other end of the shaft member and adapted to contact the ground. Occupational ingress activates the seat actuation member to move from a first position to a second position, which causes the shaft member to rotate in concert therewith such that the friction member also moves from a first position in substantial contact with the ground to a second position spaced a distance above the ground.

23 Claims, 5 Drawing Sheets

WHEELCHAIR BRAKE APPARATUS AND WHEELCHAIR INCLUDING SAME

BACKGROUND OF THE INVENTION

The present invention relates to wheelchair brakes for preventing unwanted rearward movement of a wheelchair during an occupant's transitional ingress and egress, and more particularly to a wheelchair having a brake apparatus that automatically releases when a patient is properly seated.

Using a wheelchair enables patients suffering from various physical and mental disabilities to engage in some level of activity without experiencing the pain or limitations ordinarily placed upon them, and many patients who use wheelchairs are not permanently confined thereto. For these patients, the wheelchair is a convenient tool to facilitate mobility that is not possible otherwise. But often, getting in and out of the wheelchair can pose a problem for such users, in that the chair may roll backward unexpectedly as the patient transitions from standing to sitting, and vice versa. It is especially important that the wheelchair remains stationary during this period, since the natural motion associated with transitioning from sitting to standing, and vice versa, tends to transmit a rearward force on the wheelchair. Further, because only a minimal force is required to move the wheelchair backwards rather rapidly, the patient is extremely vulnerable to falling injuries.

In the past, various attempts to prevent such unwanted movement involved installing a braking mechanism on the wheelchair. In fact, most wheelchairs incorporate some type of brake which stabilizes the wheelchair in a stationary position by preventing rotation of the rear wheels. Conventional wheelchairs which are foldable for storage are invariably fitted with hand-operated brakes. These brakes engage the main drive wheels of the wheelchair, and are applied by the user, or an assistant, to stabilize the wheelchair before the user is seated. Once seated, the user releases the brakes by hand to again permit wheelchair mobility, and when the user wishes to leave the wheelchair, the brakes are re-applied. Brakes of this conventional type are adequate when the user is not seriously physically handicapped and when the user is in substantial control of his mental faculties. However, when the user is severely handicapped or otherwise unable to operate the hand brake, manual brakes are quite inadequate. An unaided user attempting to get into, or out of, a wheelchair which is not locked into a stationary position is faced with a difficult and dangerous task. Further, an unbraked wheelchair used as a temporary support to assist walking also presents a serious hazard to the user.

One of the most widely used devices for stopping and securing the wheelchair is a brake similar to that shown in U.S. Pat. No. 4,570,756 to Minnebraker et al., in which a lever arm is provided to urge a braking member into contact with the tread of the wheelchair tire. However, despite its popularity, this brake causes unnecessary wear to the tire tread, lacks substantial holding efficiency on sloped surfaces, and becomes almost unusable when the tire is wet. Since the device is only applied to one wheel, applying stopping action on both wheels of the wheelchair requires installation of two devices that must be engaged using two hands, which may not be an available option for a particular patient.

Similar wheelchair brakes are also disclosed in U.S. Pat. No. 3,529,700 to Marshall; U.S. Pat. No. 2,426,451 to Hammack; U.S. Pat. No. 4,384,732 to Wierwille; U.S. Pat. No. 4,852,697 to Kulik; and U.S. Pat. No. 4,350,227 to Knoche. All of these disclose braking devices for wheelchairs wherein braking pressure is applied directly to the tire rather than to the wheel rim.

Because of the above problems typically associated with prior wheelchair brakes, attempts have been made to provide an alternative brake system which automatically remains braked while the wheelchair is unoccupied, and which releases automatically under the weight of the user when properly seated.

For example, U.S. Pat. No. 4,623,043 to Babilas discloses an automatic wheelchair brake that automatically locks both wheels when a patient attempts to rise from the wheelchair. While seated, the patient can manually operate a three-way lever brake having a manual-locked, a manual-unlocked and an automatic position. If the patient attempts to rise while the brake lever is in the manually unlocked position, the lever automatically returns to the automatic position and both wheels still lock automatically. After the patient has exited, the wheelchair may only be moved by shifting the operating lever to the manual unlock position. However, the threat of rollback remains after the wheelchair is freely repositioned, especially if an unaided patient forgets to re-engage the manual-lock before sitting, or another unaware patient attempts to sit in the unbraked wheelchair. Thus, despite the automatic engagement feature, the manual nature of this brake is not generally desirable for seriously impaired patients.

Another wheelchair having an automatically engaging braking system is disclosed in U.S. Pat. No. 3,529,700 to Marshall, and uses chains or rod linkages connected between a set of rigid actuating bars attached to the seat panel to operate a pair of transverse brake levers which engage the main wheels. U.S. Pat. No. 4,320,818 to Knoche discloses a wheelchair brake assembly for use with a conventional foldable wheelchair which provides a pair of rearwardly extending brake arms connected to adjacent side frames underneath the seat. Each brake arm includes a transverse forward portion pivoted to the side frame and having a brake shoe biasing into engagement with a drive wheel. The rearward portion of each brake arm is provided with a post engageable by the wheelchair seat to pivot the brake shoe out of engagement with the wheel when the seat is depressed and moved downwardly by the weight of an occupant. The wheelchair side frames are connected by a tension spring to ensure that the brake is engaged when the wheelchair is unoccupied.

Yet another prior art wheelchair brake is the anti-rollback assembly of U.S. Pat. No. 6,092,824 to Ritchie. The one-way brake assembly is shown in FIGS. 1 and 2 as an example of a prior art wheelchair brake that automatically immobilizes the wheelchair against rearward movement when the occupant attempts to rise.

Figure 1:
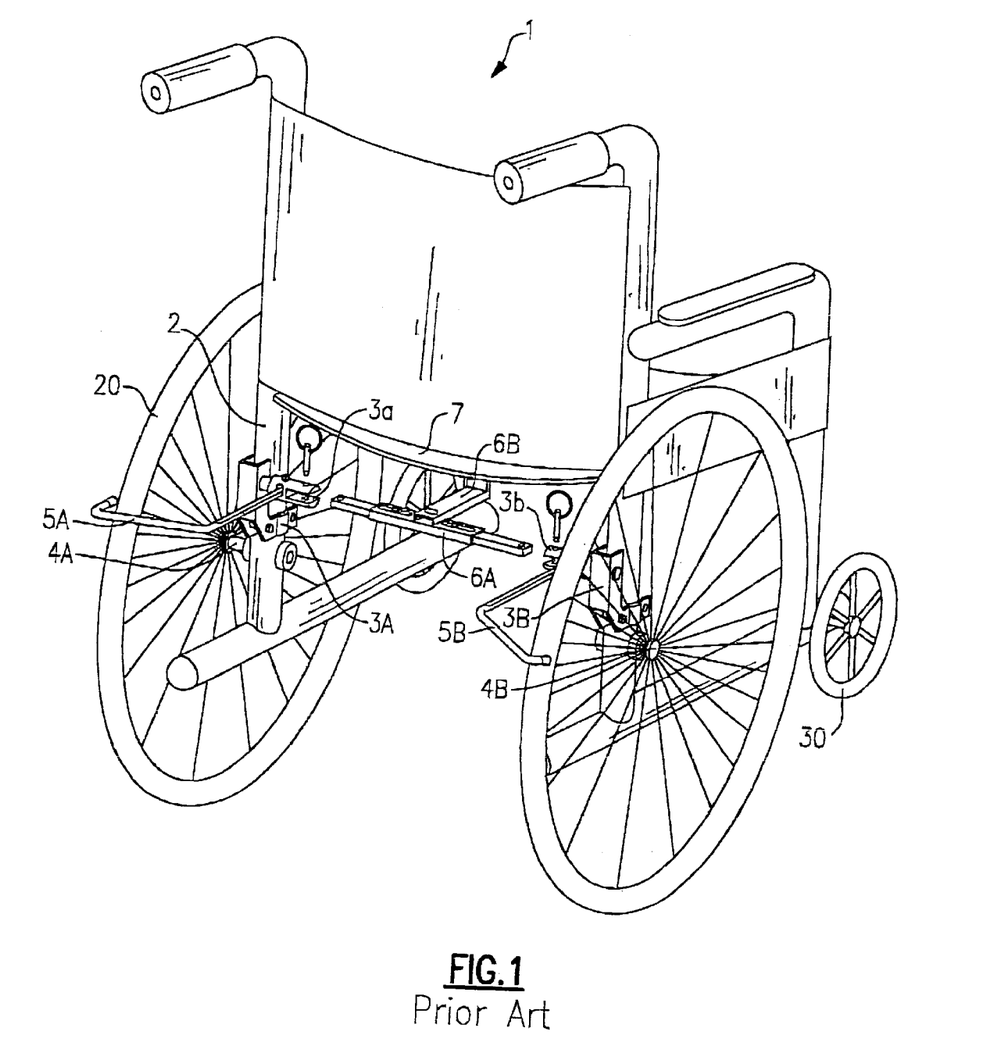
FIG. 1 is a perspective view of a wheelchair having a prior art braking assembly attached thereto.
Figure 2:
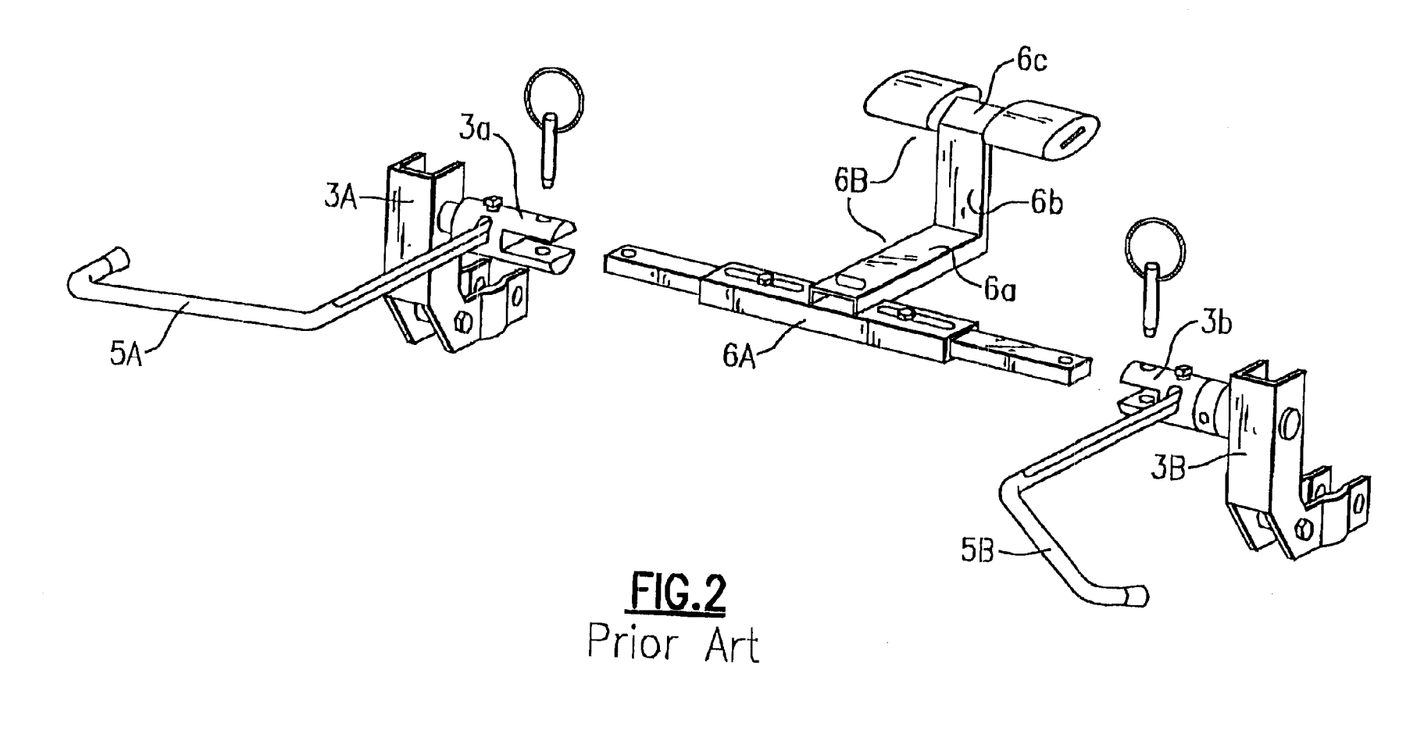
FIG. 2 is a perspective view showing the multitude of components required of the prior art braking assembly of FIG. 1, shown in a partially assembled condition.

More specifically, FIG. 1 shows a wheelchair 1 having a frame 2 and an anti-rollback assembly. The anti-rollback assembly includes fastening devices 3A and 3B attached to opposing portions 2A and 2B of the frame 2 above the point where the opposing axles 4A and 4B intersect the frame 2. The fastening devices 3A and 3B include a large number of individual components as shown in FIG. 2, but the rotatable connection members 3a and 3b are most noteworthy for purposes of this discussion. A rigid crossbar 6A is rotatably attached to and interposed between the rotatable connection members 3a and 3b such that the rigid crossbar 6A transversely connects the fastening members 3A and 3B over the horizontal distance spanning between the two opposing sides 2A and 2B of the frame 2. The rigid cross bar 6A includes an arm 6B having a first portion 6a perpendicularly extending from the horizontal rigid crossbar 6A and joining with a second portion 6b at an elbow. The second portion 6b extends vertically upward from the elbow such that a third portion 6c is positioned under the wheelchair seat 7. A pair of brake arms 5A and 5B are rigidly attached to the rotatable connection members 3a and 3b and positioned to contact the rear wheels 20A and 20B such that the rear wheels are not moveable. When a patient sits on the wheelchair seat 7, the third portion 6c of the arm 6B is pressed downward, causing the rigid crossbar 6A to rotate in a rearward direction. The brake arms 5A and 5B lift upward in co-rotation with the rigid crossbar 6A and out of contact with the rear wheels 20A and 20B which are then freely moveable.

Another prior art wheelchair brake assembly is the wheelchair rollback stop of U.S. Pat. No. 6,347,688 to Hall et al. The device of Hall et al. includes a multi-part lever mechanism consisting of two levers that are attached to a wheelchair via an elongated (modified) axle bolt which acts as a fulcrum. The multi-part lever mechanism is activated (i.e., a plurality of posts with cane ends are pressed against the ground) when no patient is seated on the seat of the wheelchair, and deactivated when a patient's weight depresses the wheelchair seat. The design of the multi-part lever mechanism involves a large number of individual components which must be assembled and adjusted to ensure that the rollback stop performs properly. For example, an unmodified wheelchair (i.e., a wheelchair having a standard axle bolt) must be modified, that is, the standard bolt must be removed and replaced with the elongated axle bolt mentioned above. In most cases, when the wheel axle bolt is removed from the wheelchair, the wheel requires substantial bracing to avoid complete removal, due to the fact that the removed axle bolt can no longer secure the wheel to the wheelchair. In that manner, to modify a wheelchair to accommodate the rollback stop of Hall et al., replacing an existing axle bolt is no small task. Once fitted with a suitable (i.e., elongated) axle bolt, the remainder of the multi-part lever mechanism must be attached and adjusted using a plurality of pins, springs, bolts, and set screws. Ultimately, installation is time consuming and complex.

Although automatic brakes, in general, offer advantages over manual brakes, room for improvement remains. Particularly, one problem is that the above mentioned automatic wheelchair brakes include a multitude of small parts which must be precisely adjusted to work in concert to accomplish the desired effect. Many people who are responsible for wheelchair maintenance are thus hesitant to tackle such complex installation of multi-component brakes.

Portability and storage of unoccupied wheelchairs are also hindered by complex automatic brake assemblies that typically brace the frame of the wheelchair transversely. Once automatic brakes with such rigid crossbars are installed, the brakes must be at least partially uninstalled to store, transport, or otherwise collapse the unoccupied wheelchair. Given the complex nature of the multiple-component assemblies, foldable storage and transport is not easily facilitated.

Another problem is that, in some brake designs, forward movement is restricted by the engaged brakes when the wheelchair is unoccupied, such that some type of a weight must first be placed on the empty seat to disengage the brakes and allow the desired forward motion, or a separate, complex mechanism must also be assembled to the wheelchair to disengage the brake. Further, positioning an unoccupied wheelchair by turning or moving it backward is not possible without placing a weight in the seat or otherwise mechanically disengaging the brakes.

Thus, it would be desirable to provide a wheelchair having a brake assembly that overcomes the drawbacks of the prior art. It would be particularly desirable to provide a cost effective wheelchair brake apparatus capable of automatic activation and release by an occupant, having few components to facilitate easy installation, having a nonrestrictive assembled structure to facilitate easy storage, and having a comfortable and efficient means of preventing unwanted motion of the wheelchair while users transition from a sitting position to a standing position, or vice versa.

SUMMARY OF THE INVENTION

It is an object of the present invention to overcome the drawbacks in the prior art, particularly to provide an automatically engageable and releasable wheelchair brake having few components to facilitate easy installation, having a nonrestrictive assembled structure to facilitate easy storage, and having a comfortable and efficient means of preventing unwanted motion, such as rollback, of the wheelchair while users transition from a sitting position to a standing position, or vice versa.

According to one embodiment of the present invention, an automatically engageable and releasable brake apparatus adaptable to be attached to a wheelchair is provided, including a connection mechanism adapted to be attached directly to a portion of the frame of the wheelchair proximate a rear wheel of the wheelchair, and a seat actuation member extending from a portion of the connection mechanism and adapted to be positioned substantially beneath the seat of the wheelchair. The brake apparatus also includes a shaft member extending from a first end thereof to an opposed second end thereof, positioned to extend substantially downwardly from a portion of the connection mechanism proximate the first end of the shaft member, and a friction member positioned proximate the second end of the shaft member and adapted to contact a ground surface on which the wheelchair is sitting.

According to the above embodiment of the present invention, occupational ingress, i.e., a user being seated, activates the seat actuation member to substantially contemporaneously move from a first position to a second position, which in turn causes the shaft member to move such that the friction member moves from a first position in substantial contact with the ground surface on which the wheelchair is located to a second position spaced a distance above the ground surface. Furthermore, occupational egress, i.e., when a user vacates the seat, activates the seat actuation member to move from the second position to the first position, which in turn causes the shaft member to move such that the friction member contemporaneously moves in relative concert from the second position spaced a distance above the ground surface to the first position in substantial contact with the ground surface. Thus, when the wheelchair is occupied, the friction member is in the second position, which allows the wheelchair to move both forward and backward under the user's direction. When the wheelchair is vacated, the friction member is in the first position in contact with the ground surface, which stabilizes the wheelchair and prevents rearward motion.

The connection mechanism preferably includes at least one biasing member that urges the seat actuation member and the friction member toward their respective first positions. The length of the shaft member is preferably sufficient to allow the friction member to firmly contact the ground surface on which the wheel chair is sitting when the friction member is in the first position. Preferably, the connection mechanism is positioned on a vertical portion of the wheelchair frame approximately half the distance between the rear wheel axle and the base of the wheelchair seat.

The brake apparatus of the present invention is easy to install on a wheelchair using few tools and requires only minimal manual adjustments. In fact, very little manual positioning is needed to attach the connection mechanism, and both the shaft and the seat actuation members are easily positioned thereafter. In that manner, proper installation involves few parts, a single wrench, and as few as three bolts or Allen-head screws. The relative simplicity of the present invention thus eliminates the installation and maintenance problems commonly experienced in conjunction with the complex braking assemblies of the prior art.

The brake apparatus described above is assembled by first securing the connection mechanism to the wheelchair frame. As described above, the position of the connection mechanism is preferably about half the distance between the rear wheel axle and the base of the seat. The connection mechanism can be firmly attached in the appropriate position using a single nut and bolt (carriage bolt) assembly and tightened using a wrench. Next, the seat actuation member is assembled to the connection mechanism and positioned so that a portion of the seat actuation member raises the contour of the base of the unoccupied seat approximately 1 inch to 1.5 inches. The seat actuation member is then tightened in its position with respect to the connection mechanism using an appropriate fastener (e.g., Allen-head type set screw). It should be noted, however, that the position of the seat actuation member may need to be adjusted if an additional pad is placed in the wheelchair seat. In any event, the assembly should be tested after installation to ensure proper positioning of the seat actuation member before an actual patient is permitted to use the wheelchair. This is merely a common sense safety measure.

After the seat actuation member is positioned and secured, the shaft member is attached to the connection mechanism with the friction member oriented downwardly. The length of the shaft extending from the connection mechanism toward the friction member is adjusted so that the friction member firmly rests on the surface on which the wheel chair is sitting. The shaft member is held in the position by tightening a second fastener (e.g., an Allen-head type screw) proximate the connection mechanism. Upon completion of these three easy assembly steps, the wheel chair is properly equipped with the above embodiment of the brake apparatus of the present invention.

According to a second embodiment of the present invention, an automatically engageable and releasable brake apparatus adaptable to be attached to a wheelchair is provided, including a first connection mechanism adapted to be attached directly to a portion of the frame of the wheelchair proximate a rear wheel of the wheelchair, and a first seat actuation member extending from a portion of the first connection mechanism and adapted to be positioned substantially beneath the seat of the wheelchair. The brake apparatus also includes a first shaft member extending in a longitudinal direction from a first end to an opposed second end thereof, positioned to extend substantially downwardly in the longitudinal direction from a portion of the first connection mechanism proximate the first end of the first shaft member, and a first friction member positioned proximate the second end of the first shaft member and adapted to contact a ground surface on which the wheelchair is sitting. The brake apparatus further includes a second connection mechanism adapted to be attached directly to a portion of the frame of the wheelchair proximate the other rear wheel of the wheelchair, and a second seat actuation member extending from a portion of the second connection mechanism and adapted to be positioned substantially beneath the seat of the wheelchair. A second shaft member is also included, extending in a longitudinal direction from a first end to an opposed second end thereof, positioned to extend substantially downwardly in the longitudinal direction from a portion of the second connection mechanism proximate the first end of the second shaft member, and a second friction member positioned proximate the second end of the second shaft member and adapted to contact a ground surface on which the wheelchair is located.

According to the above second embodiment of the present invention, occupational ingress, as defined above, activates each of the first and second seat actuation members to move in relative concert from a first position to a second position, which in turn causes the first and second shaft members to contemporaneously move in relative concert such that the first and second friction members also move from a first position in substantial contact with the ground surface to a second position spaced a distance above the surface on which the wheelchair is located. Furthermore, occupational egress, as defined above, activates the first and second seat actuation members to move from the second position to the first position in contact with the ground surface, which in turn causes the first and second shaft members to substantially contemporaneously move in relative concert such that the friction members also move from the second position spaced a distance above the ground surface to the first position in substantial contact with the ground surface. That is, like in the above first embodiment, when the wheelchair is occupied, the friction members are in the second position, which allows the wheelchair to move both forward and backward under the user's direction. When the wheelchair is vacated, the friction members are in the first position, which stabilizes the wheelchair and prevents rearward motion.

Preferably, the first and second shaft members are substantially parallel and oppose each other transversely across a substantially horizontal distance.

In a preferred mode of the present invention, an unoccupied wheelchair is braced against rearward movement near each of the main drive wheels without using a rigid crossbar for support. Additionally, the strength of the biasing members of the connection mechanism can be controlled, and independent yet coordinated movement of the parallel shaft members when the seat actuation members are activated is possible, which further eliminates the need for a rigid crossbar. In that manner, the fully assembled wheelchair brake apparatus of the present invention does not have to be removed to allow foldable storage of the wheelchair.

The present invention offers another advantage over prior art wheelchair brakes in that an unoccupied wheelchair equipped with the braking apparatus of the present invention can still be moved forward and turnably positioned without significant resistance or inhibition. That is, the engaged friction members slightly disengage to drag behind the wheelchair without causing any substantial restriction to the directed forward and turning motion movement.

Moreover, according to another embodiment of the present invention, the shaft member is equipped with a threaded knob proximate the connection mechanism, which can be used to manually loosen the shaft member and raise the friction member above the ground surface. This minor adjustment is performed quickly and easily, allows unimpeded forward and backward transportation of the wheelchair and helps reduce wear of the friction members during transportation of the unoccupied wheelchair.

According to a third embodiment of the present invention, an automatically engageable and releasable brake apparatus adaptable to be attached to a wheelchair is provided, including a first connection mechanism adapted to be attached directly to a portion of the frame of the wheelchair proximate a rear wheel of the wheelchair, and a second connection mechanism adapted to be attached directly to a portion of the frame of the wheelchair proximate the other rear wheel of the wheelchair and opposite the first connection mechanism. The brake apparatus also includes a seat actuation member having a first portion extending from a first portion of the first connection mechanism, a second portion extending from a second portion of the second connection mechanism, and a third portion substantially connecting the first and the second portions of the seat actuation member. At least the third portion of the seat actuation member is adapted to be positioned substantially beneath the seat of the wheelchair. A first shaft member is included, extending in a longitudinal direction from a first end thereof to an opposed second end thereof and positioned to extend substantially downwardly in the longitudinal direction from a second portion of the first connection mechanism proximate the first end of the first shaft member, and a first friction member positioned proximate the second end of the first shaft member and adapted to contact a ground surface on which the wheelchair is sitting. A second shaft member is further included, extending in a longitudinal direction from a first end thereof to an opposed second end thereof and positioned to extend substantially downwardly in the longitudinal direction from a second portion of the second connection mechanism proximate the first end of the second shaft member, and a second friction member positioned proximate the second end of the second shaft member and adapted to contact a ground surface on which the wheelchair is sitting.

According to the above third embodiment of the present invention, occupational ingress activates at least the third portion of the seat actuation member to move from a first position to a second position, which in turn causes the first and second shaft members to move such that the first and second friction members also substantially contemporaneously move in relative concert from a first position in substantial contact with the surface on which the wheelchair is located to a second position spaced a distance above the ground surface. Furthermore, occupational egress, as defined above, activates at least the third portion of the seat actuation member to move from the second position to the first position, which in turn causes the first and second shaft members to move such that the first and second friction members also substantially contemporaneously move from the second position spaced a distance above the ground to the first position in substantial contact with the ground surface. Thus, as in the previous embodiments, when the wheelchair is occupied, the friction members are in the second position, which allows the wheelchair to move both forward and backward under the user's direction. And, when the wheelchair is vacated, the friction members are in the first position, which stabilizes the wheelchair and prevents rearward motion.

Preferably, the first and second portions of the seat actuation member are connected to the third portion to facilitate collapsible storage of the wheelchair. Any type of connector that allows the first and second portions to move in conjunction with the third portion when the wheelchair is folded can be used, so long as the connectors do not prevent the three portions of the seat actuation member from operating as a substantially rigid unit when the third portion of the seat actuation member is moved from the first position to the second position during occupational ingress.

As described above, various embodiments of the present invention are quickly and easily installed on many different types of wheelchairs using a minimal number of tools, and installations require only minor manual adjustments to ensure proper performance during use. Further, because a rigid transverse brace bar is not required, the brake apparatus of the present invention does not need to be disassembled in order to fold, store or transport the wheelchair. Moreover, the structural configuration of the brake apparatus of the present invention allows an unoccupied wheelchair to be pushed forward or turned, whereas such motion has been heretofore restricted by many of the prior art brake assemblies.

BRIEF DESCRIPTION OF THE DRAWINGS

For a better understanding of the nature and objects of the invention, reference should be made to the following detailed description of a preferred mode of practicing the invention, read in connection with the accompanying drawings, in which.

DETAILED DESCRIPTION OF THE INVENTION

Figure 3A:
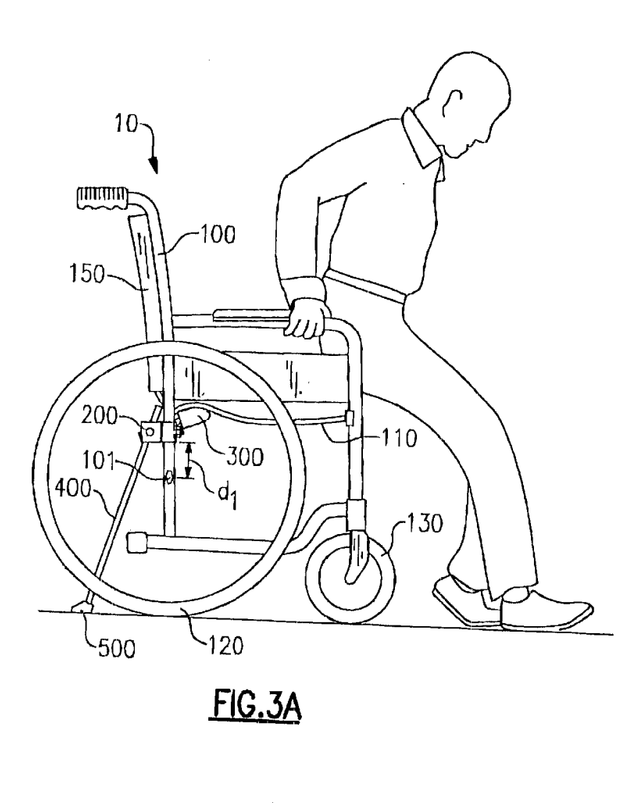
FIG. 3A is a side view showing an engaged mode of a braking assembly according to one embodiment of the present invention.
Figure 3B:
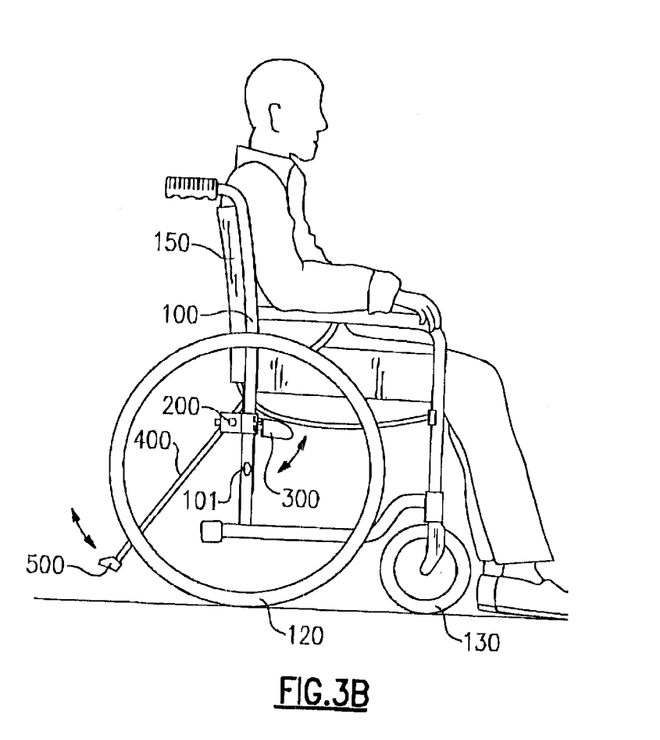
FIG. 3B is a side view showing a disengaged mode of a braking assembly according to one embodiment of the present invention.

FIG. 3A is a side view of an engaged mode of a braking assembly according to an embodiment of the present invention, specifically shown as a potential occupant attempts to sit on the seat 110 of the wheelchair 10. The brake apparatus of this embodiment includes a connection mechanism 200 affixed to the wheelchair 10 at a portion of the frame 100 proximate the rear wheel 120, and vertically spaced a distance, $d_1$, above the axle 101. Preferably, distance $d_1$ is about half the distance between the wheel axle 101 and the base of the seat 110. A seat actuation member 300 is adapted to extend from the connection mechanism 200 toward the seat 110 (as shown in FIGS. 3A and 3B), such that a portion of the seat actuation member 300 rests in a position substantially under seat 110. Preferably, the position of the connection mechanism 200 is selected such that the seat actuation member 300 raises the contour of the base of the seat 110 1–1.5 inches.

A shaft member 400 is adapted to extend in a substantially vertically angular direction from a first end proximate the connection mechanism 200 toward a second end proximate the ground surface on which the wheelchair 10 is sitting. A friction member 500 is positioned proximate the second end of the shaft member 400 in substantial contact with the ground surface on which the wheelchair 10 is sitting. The friction member 500 is a replaceable part, and as such, is equipped with a separate fastening means (not shown) to secure the friction member 500 to the shaft member 400. The fastening means is loosened to remove a worn friction member 500, and retightened to secure a new replacement friction member 500.

The shaft member 400 has a manually adjustable length, which must be sufficiently long to provide a firm contact between the friction member 500, and the ground surface. In that manner, the friction member 500 engages the ground surface on which the wheelchair 10 is sitting at an angle to effectively brace the shaft member 400 between the connection mechanism 200 and the ground surface. In this engaged state, rearward motion of the wheelchair is restricted by the angularly braced friction member 500, and rearward force applied by the potential occupant as they attempt to sit down on the seat 110 does not cause backward movement of the unoccupied wheelchair 10.

FIG. 3B is a side view of an embodiment of the present invention corresponding to FIG. 3A, shown after the brake apparatus is disengaged by occupational ingress, that is, when a standing potential occupant transitions to a seated position on the seat 110. In the ordinary course of occupational ingress, the transitioning occupant applies pressure on the seat 110 in a substantially downward direction (generally perpendicular to the horizontal plane of the seat 110), which causes the seat 110 to deform downwardly and actuate the seat actuation member 300. A portion of the seat actuation member 300 then moves in a generally downward direction along an arc path, which is predetermined by the strength of the biasing member in the connection mechanism, and a portion thereof remains substantially beneath the seat 110. As the seat actuation member 300 is thusly actuated, the shaft member 400 contemporaneously moves (lifts) in a generally upward and outward direction along a predetermined arc path such that the friction member 500 in bracing contact with the ground surface on which the wheelchair 10 is sitting moves from this first position to a new (second) position in a generally upward and outward direction along the same arc path as the shaft member 400. In that manner, the friction member 500 assumes a second position spaced a distance above the ground surface on which the wheelchair 10 is sitting, and the brake apparatus is disengaged. Thus, the wheelchair 10 can be moved backward if so desired by the seated occupant.

Although the above views are two dimensional, it should be understood that three dimensionally, the wheelchair preferably includes two parallel sets of front wheels 120 and rear wheels 130, two opposing axles 101 and two parallel sides of the wheelchair frame 100. Further, it should be understood that the brake apparatus of the present invention can be positioned and operated as described above with respect to the parallel side not represented in FIGS. 3A and 3B. In fact, it is preferred that the present invention, as described above, is installed on both sides of the wheelchair frame proximate each rear wheel 130 to further prevent any sudden, radial or pivotally-rearward movement about a singularly braced shaft member upon occupational ingress or egress.

Figure 4:
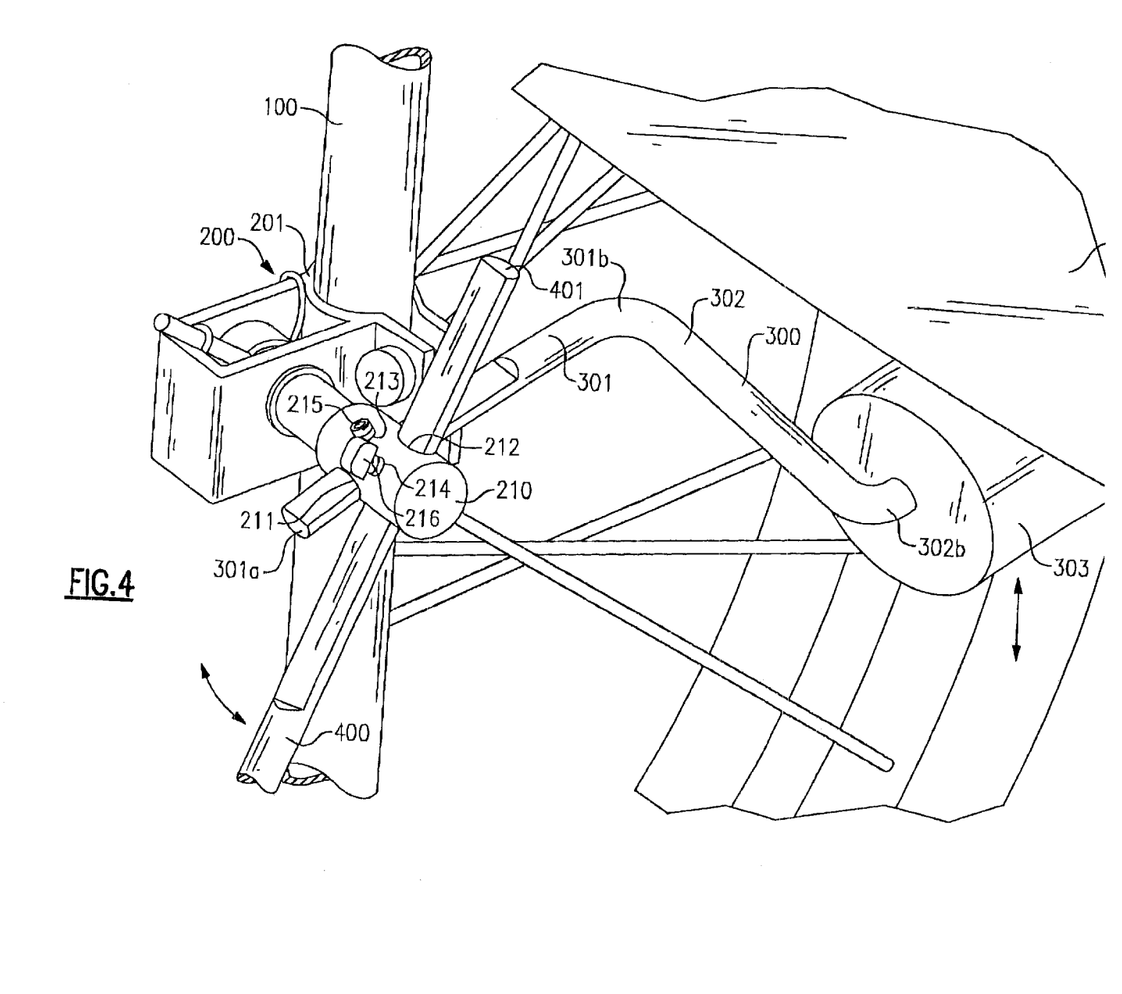
FIG. 4 is a close-up perspective view of a portion of a braking apparatus according to one embodiment of the present invention.
Figure 5:
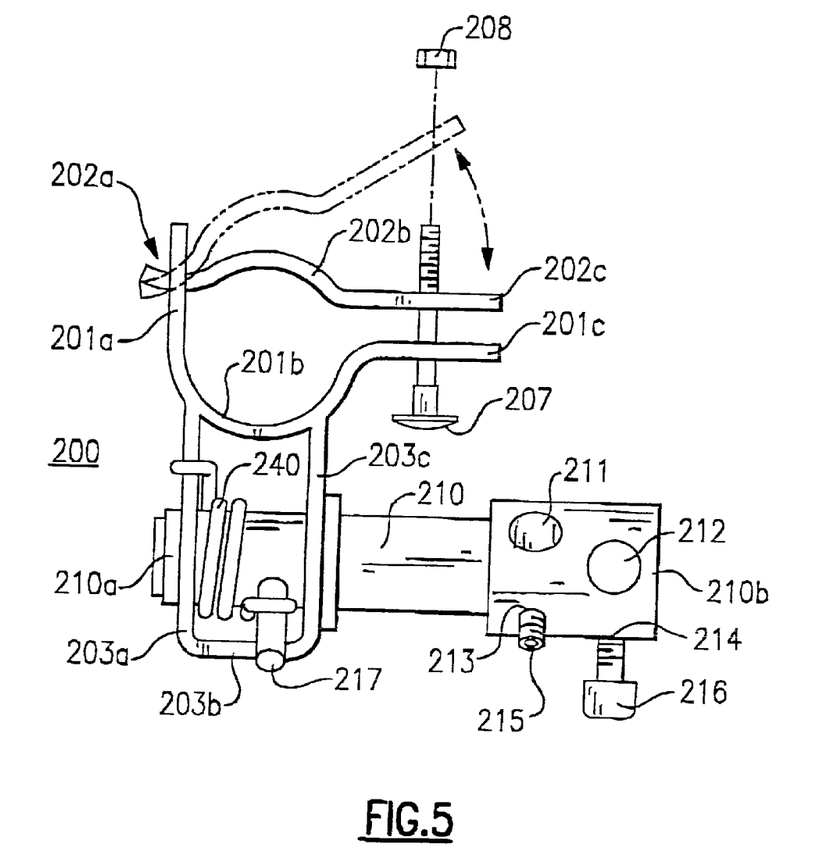
FIG. 5 is a top view of a connection mechanism of an automatic brake apparatus according to one embodiment of the present invention.

FIG. 4 is a close-up perspective view of a portion of the attached braking apparatus according to one embodiment of the present invention, which is best understood when read in conjunction with the top view of the connection mechanism 200 shown in FIG. 5. The connection mechanism 200 includes a clamp member 201 adapted to be attached directly to a portion of the a wheelchair frame 100. The clamp member 201 includes a first part 201a extending toward an elbow 201b in a first direction. An integrally formed clamp arm 201c extends from the elbow 201b in a second direction substantially perpendicular to the first direction. A removable clamp arm 202 is also provided, including a first part 202a adapted to be situated in a slot proximate the first part 201a of the clamp body 201 having an elbow 202b from which a second part 202c extends in the second direction.

The clamp member 201 further includes an integrally formed third portion 203. A first part 203a extends from a portion of the first part 201a of the clamp member 201 in the first direction, a second part 203b extends from the first part 203a in the second direction, and a third part 203c extends from the second part 203b in the first direction. In that manner, the three parts 203a–c of the third portion 203 form a U-shaped extension of the clamp member 201 such that the elbow 201b thereof is substantially interposed between the first part 203a and the third part 203c of the third portion 203 in the second direction.

The clamp member 201 is attached directly to wheelchair frame 100 by positioning the clamp member 201 about a vertical portion of the wheelchair frame 100 at the elbow 201b, which provides a half-pocket shape into which a correspondingly shaped portion of the wheelchair frame fits. The first end 202a of the removable clamp arm 202 is situated in the corresponding slot proximate the first end 201a of the clamp member 201, such that the elbow 202b provides a half-pocket shape into which a correspondingly shaped portion of the wheelchair frame fits opposing the first elbow 201b. In that manner, the wheelchair frame 100 is interposed between and essentially circumscribed by the opposing elbows 201b and 202b. Although it is not shown, it should be noted that an inner surface of the removable clamp arm 202 can be formed to include a plurality of ridges or a serrated section that helps to reduce radial movement of the connection member 200 about the wheelchair frame 100.

A first fastening member 207 (e.g., a carriage bolt) is inserted into a hole provided on the second part 201c of the clamp member 201 in the first direction, and extends through a corresponding and opposing hole provided on the second part 202c of the clamp arm 202. As shown, a second fastening member 208 (e.g., a nut) is attached to the first fastening member 207 proximate the side extending from the second part 202c of the clamp arm 202 to maintain and fix the positions of the clamp arms 201c and 202c and further prevent the first fastening member 207 from disengaging in the first direction.

It should be noted that although the fastening members shown represent a nut and bolt assembly, any fastening member that will effectively hold the two clamp arms together to secure the clamp member onto the wheelchair frame can be used. Suitable examples of such fastening members include various screw assemblies, as well as Allen-head type screws. Additionally, the fastening means can be initially inserted through a hole in either clamp arm, and in that light, the present invention is not limited to the above fastening procedure or the structure shown in FIG. 4. It should also be noted that the clamping member 201 of the present invention is attached directly to a wheelchair frame after being pre-assembled at the manufacturer as the connection mechanism 200 rather than as a naked clamp.

The connection mechanism 200 further includes a pivoting member 210 extending from a first end 210a to a second end 210b along a pivot axis. The pivoting member 210 includes a first through-bore 211 proximate the second end 210b thereof, and a first fastening bore 213 positioned perpendicular to the through-bore 211. The first fastening bore 213 extends from the surface of pivoting member 210 proximate the second end 210b and terminates at the point of intersection with the first through-bore 211. The pivoting member 210 also includes a second through-bore 212 proximate the second end 210b thereof, and a second fastening bore 214 positioned perpendicular to the second through-bore 212. The second fastening bore 214 extends from the surface of pivoting member 210 proximate the second end 210b and terminates at the point of intersection with the second through-bore 212. A fastening member 215 (e.g., an Allen-head screw) is adapted to be positioned within the first fastening bore 213, and another fastening member 216 is adapted to be positioned within the second fastening bore 214. Preferably, the fastening member 216 includes a knob-like end. The knob end of the fastening member 216 is used when the wheelchair is unoccupied to adjust the length of the shaft member 400 to raise the friction member 500 out of the first position and aid repositioning of the empty wheelchair. As shown, the positions of the first and second through-bores 211 and 212 are radially offset from one another.

A projection member 217 included proximate the first end 210a of the pivoting member 210 is positioned on a portion of the pivoting member 210 being interposed between the first side 203a and the third side 203c of the clamp member 201. The connection mechanism 200 further includes a biasing member 240 (e.g., a spring) positioned about the pivoting member 210 proximate the first end 210a thereof, and interposed between the first and third portions 203a and 203c of the third part of the clamping member 201. More specifically, a first biasing portion 241 of the biasing member 240 extends toward the clamp member 201, having an end 241a connected to the first portion 203a of the third part 203 of the clamp member 201. The body of the biasing member 240 is wound around the pivoting member 210, and a second biasing portion 242 is connected to the projection member 217.

As can be appreciated from the foregoing description, the connection mechanism 200 described above is essentially a single unit that can be easily attached to a wheelchair frame by one person using a single tool.

It should be noted that although the above descriptions relate to a single connection mechanism, two are preferably included in various embodiments of the present invention. That is, the present invention preferably includes one brake apparatus, including the above-described connection mechanism, for each of the rear wheels of the wheelchair.

The connection mechanism 200 is installed on the wheelchair frame 100 by placing the elbow portion of the clamp member 201 about a vertical portion of the wheelchair frame at an appropriate distance, $d_1$ (see FIGS. 3A and 3B), from the axle of the corresponding wheel, positioning the clamp arm 202, and tightening the second fastening member (nut) 208 onto the first fastening member (bolt) 207. As mentioned above, depending upon the type of fastening member actually used, this can be easily accomplished with just a few turns of a wrench.

The brake apparatus also includes a seat actuation member 300 that requires separate, yet simple, manual installation after the connection mechanism 200 is properly attached. The seat actuation member 300 includes a first portion 301 which extends from a first end 301a to an elbow region 301b in one direction (as shown, the first portion 301 extends substantially in the first direction), at which point the second portion 302 begins, and extends from the elbow region 301b to a second elbow region 302b in another perpendicular direction (as shown, the second portion 302 extends substantially in the second direction). A third portion 303 is a cushioned comfort-pad extending from the second elbow region 302b in a substantially perpendicular direction (as shown, the third region 303 extends substantially in the first direction) and terminating at a position beneath the wheelchair seat 110 once installed. As mentioned above, it is preferred that the connection mechanism 200 is positioned such that the third portion 303 of the seat actuation member 300 is positioned beneath the seat 110 and raises the contour of the seat 110 approximately 1–1.5 inches.

Installing the seat actuation member 300 simply involves inserting the partially flattened portion proximate the end portion 301a of the first portion 301 through the first through-bore 211 of the pivoting member 210 such that the third portion 303 is positioned beneath the wheelchair seat 110. Once the first portion 301 is properly inserted and the third portion 303 is properly positioned, the seat actuation member 300 is secured to the connection mechanism 200 by inserting fastening member 215 into the first fastening bore 213. With just a few twists of a wrench or screwdriver, the fastening member 215 contacts the flattened portion of the first portion 301 of the seat actuation member 300 to tightly secure the seat actuation member 300 to the pivoting member 210 of the connection mechanism 200. Although the exact shape of the first portion 301 of the seat actuation member 300 is not critical, it is preferred that at least a portion of the first portion 301 is flattened to facilitate a stable gripping connection with the third fastening member 215 within the first through-bore 211.

The brake apparatus also includes a shaft member 400 and a friction member 500 (FIGS. 3A–3B), which are essentially a single unit for installation purposes, and can be installed as quickly and easily as the seat actuation member 300 described above. The shaft member 400 is an elongate shaft extending from a first end 401 to an opposed second end. The friction member 500 is a stopping boot (which can also be described as a brake foot or pad), that is positioned proximate the second end of the shaft member 400 and adapted to contact the ground surface on which the wheelchair is sitting to provide the desired braking capabilities when the brake apparatus is engaged.

During installation, the first end 401 of the shaft member 400 is inserted through the second through-bore 212 of the pivoting member 210. After the length is properly adjusted to ensure proper ground contact of the friction member 500 and maintain the desired braking angle, fastening member 216 is inserted into the second fastening bore 214 until it contacts the shaft member 400 in the second through-bore 212. With just a few twists of a wrench or a screwdriver, the fastening member 216 secures the shaft member 400 to the pivoting member 210 of the connection mechanism 200, and installation of the brake apparatus is complete. Although the exact shape of the first portion 401 of the shaft member 400 is not critical, it is preferred that at least a portion of the first portion 401 is flattened to facilitate a stable, non-rotational gripping connection with the fastening member 216 within the second through-bore 212. As described above, the fastening member 216 can be rotated manually to allow easy adjustment of the length of the shaft 400.

Once the brake apparatus has been properly installed, an unoccupied wheelchair thusly equipped is automatically braked and primed for use. Referring to FIGS. 3A and 3B, in operation, the friction member 500 (on each side of the wheelchair frame) is in the first position in substantial contact with the surface on which the wheelchair is sitting, and the seat actuation member 300 is in the first position beneath the seat 110. The seat actuation member 300 is held in this first position under resting spring tension from the biasing member 240, and the braced shaft member 400 and friction member 500 are subject to a corresponding bias tension. While the automatic brake is engaged, the wheelchair is immobilized against rearward motion. As a potential occupant attempts to sit in the seat 110, the natural rearward forces communicated onto the wheelchair do not cause the wheelchair to roll backward, and the wheelchair remains stable and stationary during occupational ingress.

It is important to emphasize that although the present drawings show a single brake apparatus, the wheelchair brake of the present invention preferably includes one such apparatus proximate each rear wheel of the wheelchair.

While a potential occupant assumes a seated position as shown, the seat actuation member 300 is engaged under the sitting pressure that downwardly deforms the seat 110. It should be noted that the strength of the biasing member 240 should be sufficient bias the seat actuation and friction members in their respective first positions without placing excessive tension force on the seat actuation member 300. That is, the spring tension of the biasing member 240 should be sufficiently strong to hold the seat actuation member 300 in the first position under the seat 110 without having it uncomfortably press upon the seat 110.

As the occupant rises, the sitting pressure on the wheelchair seat 110 is removed, and the tension in the biasing member 240 is released. The pivoting member 210 rotates, and accordingly, the seat actuation member 300 under the spring tension moves from the second position back to the first position where it remains under resting bias tension. Simultaneously, the shaft member 400 also rotates with the pivoting member, such that the friction member 500 also moves downward along the predetermined arc and back into the first position in substantial contact with the ground surface on which the wheelchair is sitting. With the brake apparatus engaged once again, the wheelchair is situated to provide stable support for an occupant as they attempt to enter the seat thereof.

While the present invention has been particularly shown and described with reference to the preferred mode as illustrated in the drawings, it will be understood by one skilled in the art that various changes may be effected therein without departing from the spirit and the scope of the invention as defined by the claims.

We claim:

1. An automatically engageable and releasable brake apparatus adaptable to be attached to a wheelchair, said brake apparatus comprising:

a connection mechanism adapted to be attached directly to a portion of the frame of the wheelchair proximate a rear wheel of the wheelchair, said connection mechanism comprising a pivoting member having a pivot axis, said pivoting member being rotatably coupled to said connection mechanism and extending in a direction substantially parallel to the rotational axis of the rear wheel of the wheelchair, said pivoting member comprising at least one through-bore passing from a portion of an outer surface of said pivoting member through said pivot axis and terminating at an opposed portion of the outer surface of said pivoting member, and said pivoting member further comprises at least one fastening bore positioned perpendicular to said at least one through-bore, wherein said at least one fastening bore passes from the outer surface of said pivoting member, intersects said pivot axis, and terminates proximate said pivot axis at a position within said at least one through-bore;

a seat actuation member extending from a portion of said connection mechanism and adapted to be positioned substantially beneath the seat of the wheelchair;

a shaft member extending from a first end thereof to an opposed second end thereof, and positioned to extend substantially downwardly from a portion of said connection mechanism proximate said first end of said shaft member; and a friction member positioned proximate said second end of said shaft member and adapted to contact a surface on which the wheelchair is sitting;

wherein occupational ingress activates said seat actuation member to move from a first position to a second position, which in turn causes said shaft member to move such that said friction member substantially contemporaneously moves from a first position in substantial contact with the surface on which the wheelchair is located to a second position spaced a distance above the surface on which the wheelchair is located.

2. The brake apparatus of claim 1, wherein said connection mechanism further comprises at least one biasing member operatively coupled to said pivoting member to bias said pivoting member in a first rotation direction to cause said friction member in said first position to contact a ground surface on which the wheelchair is sitting.

3. The brake apparatus of claim 1, wherein at least a portion of said shaft member is received within one of said at least one through-bores, and at least a portion of said seat actuation member is received with another one of said at least one through-bores.

4. The brake apparatus of claim 1, wherein said pivoting member further comprises at least one set screw adapted to be positioned within said at least one fastening bore to operatively retain said portion of at least one of said shaft member and said seat actuation member positioned within said at least one through-bore, wherein respective lengths of said shaft member and said seat actuation member extending from said pivoting member are adjusted by moving said portions thereof positioned within a respective one of said through-bores and fixed via said at least one set screw positioned within said at least one fastening bore.

5. An automatically engageable and releasable brake apparatus adaptable to be attached to a wheelchair, said brake apparatus comprising:

a first connection mechanism adapted to be attached directly to a portion of the frame of the wheelchair proximate a rear wheel of the wheelchair;

a first seat actuation member extending from a portion of said first connection mechanism and adapted to be positioned substantially beneath the seat of the wheelchair;

a first shaft member extending in a logitudinal direction from a first end thereof to an opposed second end thereof, and positioned to extend substantially downwardly in said longitudinal direction from a portion of first connection mechanism proximate said first end of said first shaft member;

a first friction member positioned proximate said second end of said first shaft member and adapted to contact a ground surface on which the wheelchair is sitting;

a second connection mechanism adapted to be attached directly to a portion of the frame of the wheelchair proximate the other rear wheel of the wheelchair;

a second seat actuation member extending from a portion of said second connection mechanism and adapted to be positioned substantially beneath the seat of the wheelchair;

a second shaft member extending in a longitudinal direction from a first end thereof to an opposed second end thereof, and positioned to extend substantial downwardly in said longitudinal direction from a portion of said second connection mechanism proximate said first end of said second shaft member; and a second friction member positioned proximate said second end of said second shaft member and adapted to contact a ground surface on which the wheelchair is sitting;

wherein said first and said second connection mechanisms each comprise a first and a second pivoting member, respectively, said first pivoting member having a first pivot axis and said second pivoting member having a second pivot axis, and each of said first and said second pivoting members being rotatably coupled to a respective one of said first and said second connection mechanisms and extending in a direction substantially parallel to the rotational axis of the rear wheel of the wheelchair;

wherein said first and said second pivoting members each comprise at least one through-bore passing from a portion of an outer surface of a respective one of said first and said second pivoting members through said first and said second pivot axes to an opposed portion of the outer surface of said first and said second pivoting members, respectively; and wherein occupational ingress activates said first seat actuation member to move from a first position to a second position, which in turn causes said first shaft member to move such that said first friction member substantially contemporaneously moves from a first position in substantial contact with the surface on which the wheelchair is located to a second position spaced a distance above the surface on which the wheelchair is located, and further activates said second seat actuation member to move in relative concert with said first seat actuation member from a first position to a second position, which in turn causes said second shaft member to move such that said second friction member substantially contemporaneously moves in relative concert with said first friction member from a first position in substantial contact with the surface on which the wheelchair is located to a second position spaced a distance above the surface on which the wheelchair is located.

6. The brake apparatus of claim 5, wherein said first and second shaft members are substantially parallel in said longitudinal direction, and said first and second shaft members axially oppose each other transversely across a distance in a direction substantially perpendicular to said longitudinal direction.

7. The brake apparatus of claim 5, wherein said first and said second connection mechanisms further comprise a first biasing member and a second biasing member, respectively, said first and said second biasing members being operatively coupled to said first and said second pivoting members to bias a respective one of said first and said second pivoting members in a first rotation direction to cause a respective one of said first and said second friction members in said first position to contact a ground surface on which the wheelchair is sitting.

8. The brake apparatus of claim 5, wherein at least a portion of said first shaft member is received within one of said at least one through-bores of said first pivoting member, at least a portion of said second shaft member is received within one of said at least one through-bores of said second pivoting member, at least a portion of said first seat actuation member is received within another one of said at least one through-bores of said first pivoting member and at least a portion of said second seat actuation member is received with another one of said at least one through-bores of said second pivoting member.

9. The brake apparatus of claim 5, wherein each of said first and said second pivoting members further comprise at least one fastening bore positioned perpendicular to said at least one through-bore, wherein said at least one fastening bore passes from the outer surface of a respective one of said first and said second pivoting members, intersects a respective one of said pivot axes, and terminates proximate a respective one of said first and said second pivot axes at a position within a respective one of said at least one through-bores.

10. The brake apparatus of claim 9, wherein said first and said second pivoting members further comprise at least one set screw adapted to be positioned within said at least one fastening bore to operatively retain at least one of said shaft member and said seat actuation member positioned within a portion of said at least one through-bore, wherein the respective lengths of said shaft member and said seat actuation member extending from said pivoting member are adjusted by moving said portions thereof positioned within a respective one of said through-bores and fixed via said at least one set screw.

11. An automatically engageable and releasable brake apparatus adaptable to be attached to a wheelchair, said brake apparatus comprising:

a first connection mechanism adapted to be attached directly to a portion of the frame of the wheelchair proximate a rear wheel of the wheelchair;

a second connection mechanism adapted to be attached directly to a portion of the frame of the wheelchair proximate the other rear wheel of the wheelchair;

a seat actuation member having a first portion extending from a first portion of said first connection mechanism, a second portion extending from a second portion of said second connection mechanism, a third portion substantially connecting said first and said second portions of said seat actuation member, said seat actuation member being adapted to be positioned substantially beneath the seat of the wheelchair;

a first shaft member extending in a longitudinal direction from a first end thereof to an opposed second end thereof, and positioned to extend substantially downwardly in said longitudinal direction from a second portion of said first connection mechanism proximate said first end of said first shaft member;

a first friction member positioned proximate said second end of said first shaft member and adapted to contact a ground surface on which the wheelchair is sitting;

a second shaft member extending in a longitudinal direction from a first end thereof to an opposed second end thereof, and positioned to extend substantially downwardly in said longitudinal direction from a second portion of said second connection mechanism proximate said first end of said second shaft member; and a second friction member positioned proximate said second end of said second shaft member and adated to contact a ground surface on which the wheelchair is sitting;

wherein said first and said second connection mechanisms each comprise a first and a second pivoting member, respectively, said first pivoting member having a first pivot axis and said second pivoting member having a second pivot axis, and each of said first and said second pivoting members being rotatably coupled to a respective one of said first and said second connection mechanisms and extending in a direction substantially parallel to the rotational axis of the rear wheel of the wheelchair;

wherein said first and said second pivoting members each comprise at least one through-bore passing from a portion of an outer surface of a respective one of said first and said second pivoting members through said first and said second pivot axes to an opposed portion of the outer surface of said first and said second pivoting members, respectively; and wherein occupational ingress activates said seat actuation member to move from a first position to a second position, which in turn causes said first shaft member to move such that said first friction member substantially contemporaneously moves from a first position in substantial contact with the surface on which the wheelchair is located to a second position spaced a distance above the surface on which the wheelchair is located, and said seat activation member causes said second shaft member to move such that said second friction member substantially contemporaneously moves, from a first position in substantial contact with the surface on which the wheelchair is located to a second position spaced a distance above the surface on which the wheelchair is located in relative concert with said first friction member.

12. The brake apparatus of claim 11, wherein said first and second shaft members are substantially parallel in said longitudinal direction, and said first and second shaft members axially oppose each other across a distance in a lateral direction substantially perpendicular to said longitudinal direction.

13. The brake apparatus of claim 11, wherein said first and said second connection mechanisms further comprise a first biasing member and a second biasing member, respectively, said first and said second biasing members being operatively coupled to said first and said second pivoting members to bias a respective one of said first and said second pivoting members in a first rotation direction to cause a respective one of said first and said second friction members in said first position to contact a ground surface on which the wheelchair is sitting.

14. The brake apparatus of claim 11, wherein at least a portion of said first shaft member is received within one of said at lest one through-bores of said first pivoting member, at least a portion of said second shaft member is received within one of said at least one through-bores of said second pivoting member, at least a portion of said first seat actuation member is received within another one of said at least one through-bores of said first pivoting member and at least a portion of said second seat actuation member is received with another one of said at least one through-bores of said second pivoting member.

15. The brake apparatus of claim 11, wherein each of said first and said second pivoting members further comprise at least one fastening bore positioned perpendicular to said at least one through-bore, wherein said at least one fastening bore passes from the outer surface of a respective one of said first and said second pivoting members, intersects a respective one of said pivot axes, and terminates proximate a respective one of said first and said second pivot axes at a position within a respective one of said at least one through-bores.

16. The brake apparatus of claim 15, wherein said first and said second pivoting members further comprise at least one set screw adapted to be positioned within said at least one fastening bore to operatively retain at least one of said shaft member and said seat actuation member positioned within a portion of said at least one through-bore, wherein the respective lengths of said shaft member and said seat actuation member extending from said pivoting member are adjusted by moving said portions thereof positioned within a respective one of said through-bores and fixed via said at least one set screw.

17. A wheelchair comprising:

a frame configuration;

a seat member incorporated into and substantially supported by said frame configuration;

a wheel assembly having a plurality of first wheels rotatably connected proximate a front end of said frame configuration, and a plurality of second wheels rotatably connected to said frame configuration via a respective axle proximate a rear portion of said frame configuration; and a brake apparatus comprising a connection mechanism attached directly to a portion of said frame of said wheelchair proximate, but spaced a distance from, at least one of said second axles of said wheelchair, a seat actuation member extending from a portion of said connection mechanism and positioned substantially beneath said seat member of said wheelchair, a shaft member extending from a portion of said connection mechanism proximate a first end thereof in a longitudinal direction toward an opposing second end thereof, and a friction member positioned proximate said second end of said shaft member and adapted to substantially contact a ground surface on which said wheelchair is sitting;

wherein occupational ingress activates said seat actuation member to move from a first position to a second position, which in turn causes said shaft member to move such that said friction member moves from a first position in substantial contact with the surface on which said wheelchair is located to a second position spaced a distance above the surface on which said wheelchair is located, and occupational egress activates said seat actuation member to move from said second position to said first position, which in turn causes said shaft member to move such that said friction member moves from said second position spaced a distance above the surface on which said wheelchair is located to said first position in substantial contact with the surface on which said wheelchair is located.

18. The brake apparatus of claim 17, wherein said connection mechanism comprises a pivoting member having a pivot axis, said pivoting member being rotatably coupled to said connection mechanism and extending in a direction substantially parallel to the rotational axis of the rear wheel of the wheelchair.

19. The brake apparatus of claim 18, wherein said connection mechanism comprises at least one biasing member operatively coupled to said pivoting member to bias said pivoting member in a first rotation direction to cause said friction member to contact a ground surface on which the wheelchair is sitting.

20. The brake apparatus of claim 18, wherein said pivoting member comprises at least one through-bore passing from a portion of an outer surface of said pivoting member through said pivot axis to an opposed portion of the outer surface of said pivoting member.

21. The brake apparatus of claim 20, wherein at least a portion of said shaft member is received within one of said at least one through-bores, and at least a portion of said seat actuation member is received with another one of said at least one through-bores.

22. The brake apparatus of claim 20, wherein said pivoting member further comprises at least one fastening bore positioned perpendicular to said at least one through-bore, wherein said at least one fastening bore passes from the outer surface of said pivoting member, intersects said pivot axis, and terminates proximate said pivot axis at a position within said at least one through-bore.

23. The brake apparatus of claim 22, wherein said pivoting member further comprises at least one set screw adapted to be positioned within said at least one fastening bore to operatively retain at least one of said shaft member and said seat actuation member positioned within a portion of said at least one through-bore, wherein respective lengths of said shaft member and said seat actuation member extending from said pivoting member are adjusted by moving said portions thereof positioned within a respective one of said through-bores and fixed via said at least one set screw positioned within said at least one fastening bore.

* * * * *